US008752071B2

(12) United States Patent  (10) Patent No.: US 8,752,071 B2
Thomas et al.  (45) Date of Patent: Jun. 10, 2014

(54) IDENTIFYING SUBSCRIBER DATA WHILE PROCESSING PUBLISHER EVENT IN TRANSACTION

(75) Inventors: Philip J. Thomas, Lutterworth (GB); Martin J. Gale, Eastleigh (GB)

(73) Assignees: International Business Machines Corporation, New York, NY (US); The United States of America as represented by National Institutes of Health (NIH), U.S. Dept. of Health and Human Services (DHHS), Washington, DC (US)

( * ) Notice: Subject to any disclaimer, the term of this patent is extended or adjusted under 35 U.S.C. 154(b) by 926 days.

(21) Appl. No.: 12/339,749

(22) Filed: Dec. 19, 2008

(65) Prior Publication Data

US 2010/0162268 A1 Jun. 24, 2010

(51) Int. Cl.
*G06F 9/46* (2006.01)

(52) U.S. Cl.
USPC .......................................... 719/318; 719/313

(58) Field of Classification Search
None
See application file for complete search history.

(56) References Cited

U.S. PATENT DOCUMENTS

| | | | |
|---|---|---|---|
| 6,732,364 B1 * | 5/2004 | Bhaskaran et al. | 719/318 |
| 6,944,662 B2 * | 9/2005 | Devine et al. | 709/225 |
| 7,080,385 B1 | 7/2006 | Collison et al. | |
| 7,287,066 B2 | 10/2007 | Ruggaber et al. | |
| 2002/0069157 A1 * | 6/2002 | Jordan | 705/37 |
| 2002/0087740 A1 * | 7/2002 | Castanho et al. | 709/318 |
| 2002/0120607 A1 * | 8/2002 | Price et al. | 707/1 |
| 2003/0115317 A1 * | 6/2003 | Hickson et al. | 709/224 |
| 2003/0135556 A1 * | 7/2003 | Holdsworth | 709/206 |
| 2005/0021836 A1 * | 1/2005 | Reed et al. | 709/238 |
| 2005/0267973 A1 * | 12/2005 | Carlson et al. | 709/228 |
| 2007/0027702 A1 * | 2/2007 | Cox et al. | 705/1 |
| 2007/0050257 A1 * | 3/2007 | Fine et al. | 705/14 |
| 2007/0073821 A1 * | 3/2007 | Brail | 709/206 |
| 2007/0088711 A1 * | 4/2007 | Craggs | 707/10 |
| 2007/0245409 A1 * | 10/2007 | Harris et al. | 726/5 |
| 2008/0184266 A1 * | 7/2008 | Bornhoevd et al. | 719/318 |
| 2009/0054091 A1 * | 2/2009 | van Wijk et al. | 455/466 |
| 2009/0144338 A1 * | 6/2009 | Feng et al. | 707/201 |

OTHER PUBLICATIONS

Chan; "Transactional Publish/Subscribe: The Proactive Multicast of Database Changes"; 1998; ACM; p. 521.*

(Continued)

*Primary Examiner* — H S Sough
*Assistant Examiner* — Umut Onat
(74) *Attorney, Agent, or Firm* — Douglas A. Lashmit; Hoffman Warnick LLC (57) ABSTRACT

A solution for managing messaging is provided in which an event related to a publisher is identified. In response to the event, a transaction is initiated for processing the event, the event is processed within the transaction, and the transaction is committed after the event is processed. During processing, data corresponding to the event is provided for use by a set of subscribers to the event, and data related to the set of subscribers is identified. In an embodiment, a message broker in a publication and subscribe messaging environment implements the solution in order to be capable of providing the data related to the set of subscribers to the publisher. Use of the transaction ensures that the data related to the set of subscribers accurately represents the set of subscribers at the time that the data corresponding to the event was provided.

20 Claims, 3 Drawing Sheets

(56) References Cited

OTHER PUBLICATIONS

Tai et al., "Conditional Messaging: Extending Reliable Messaging with Application Conditions", Proc. 22nd IEEE International Conference on Distributed Computing Systems (ICDCS'02), 10 pages, New York.
Buchmann et al., "DREAM: Distributed Reliable Event-based Application Management", Web Dynamics, pp. 1-33, (May 2004) Germany.
Liebig et al, "Integrating Notifications and Transactions: Concepts and X2TS Prototype", Lecture Notes in Computer Science; vol. 1999. Revised Papers from the Second International Workshop on Engineering Distributed Objects, pp. 194-214 (2000).
Tai et al., "Strategies for Integrating Messaging and Distributed Object Transactions", In: Proceedings of the ACM/IFIP/USENIX 2nd International Middleware Conference (Middleware 2000), Springer LNCS 1795, 23 pages, (Apr. 2000) New York.
IBM, "A Mechanism for Avoiding Unnecessary Publications in a Publish/Subscribe Environment", IP.COM Prior Art Data Base, 6 pages, Dec. 10, 2003.

* cited by examiner

IDENTIFYING SUBSCRIBER DATA WHILE PROCESSING PUBLISHER EVENT IN TRANSACTION

TECHNICAL FIELD

The disclosure relates generally to event processing, and more particularly, to event processing on a message broker in a publish and subscribe messaging system.

BACKGROUND ART

Publish and subscribe (pub/sub) messaging uses a message broker to facilitate communications between publishers and subscribers. For example, multiple entities (e.g., users, applications, or the like) can subscribe to an event via the message broker. Subsequently, when the event occurs (e.g., the message broker receives a new message from a publisher), the message broker provides data on the event to the various subscribers.

One of the benefits of a pub/sub messaging system is the decoupling of publishers and subscribers. In particular, the message broker maintains a record of all subscriber endpoints and makes decisions about which subscribers should receive any specific publication, thereby relieving the publisher of these two responsibilities. To this extent, publishers are not required to have any knowledge of the number or detail of subscribers. However, in some situations it is desirable or necessary for a publisher to know the number/details of subscribers to which a publication has been sent.

One approach for providing the publisher with information on the subscribers requires the publisher to query the message broker for details of the subscribers to a relevant topic. The publisher can perform the query either before or after publishing a message to the topic. However, since changes to the subscribers can be made at any time, the details may not accurately reflect the details at the time of the publication. In another approach, the message broker can maintain one or more suitable logs detailing the subscribers to which each publication was forwarded, and make the logs accessible to the corresponding publisher of each publication. However, the data may not be required very often by the publisher, and the publisher must separately query the message broker following each publication for which the data is required.

SUMMARY OF THE INVENTION

Aspects of the invention provide a solution for managing messaging in which an event related to a publisher is identified. In response to the event, a transaction is initiated for processing the event, the event is processed within the transaction, and the transaction is committed after the event is processed. During processing, data corresponding to the event is provided for use by a set of subscribers to the event, and data related to the set of subscribers is identified. In an embodiment, a message broker in a publication and subscribe messaging environment implements the solution in order to be capable of providing the data related to the set of subscribers to the publisher. Use of the transaction ensures that the data related to the set of subscribers accurately represents the set of subscribers at the time that the data corresponding to the event was provided.

A first aspect of the invention provides a computer-implemented method of managing messaging, the method comprising: identifying an event related to a publisher using a message broker; initiating a transaction on the message broker for processing the event in response to the identifying; processing the event within the transaction using the message broker, the processing including: providing data corresponding to the event for use by a set of subscribers to the event; and identifying data related to the set of subscribers to the event; and committing the transaction after the processing.

A second aspect of the invention provides a computer system for managing messaging, the system comprising: a component configured to identify an event related to a publisher; a component configured to initiate a transaction for processing the event in response to the identifying; a component configured to process the event within the transaction, wherein the processing includes providing data corresponding to the event for use by a set of subscribers to the event and identifying data related to the set of subscribers to the event; and a component configured to commit the transaction after the processing.

A third aspect of the invention provides a computer program comprising program code embodied in at least one computer-readable medium, which when executed, enables a computer system to implement a method of managing messaging, the method comprising: identifying an event related to a publisher; initiating a transaction for processing the event in response to the identifying; processing the event within the transaction, the processing including: providing data corresponding to the event for use by a set of subscribers to the event; and identifying data related to the set of subscribers to the event; and committing the transaction after the processing.

A fourth aspect of the invention provides a method of generating a system for managing messaging, the method comprising: providing a computer system operable to: identify an event related to a publisher; initiate a transaction for processing the event in response to the identifying; process the event within the transaction, the processing including: providing data corresponding to the event for use by a set of subscribers to the event; and identifying data related to the set of subscribers to the event; and commit the transaction after the processing.

A fifth aspect of the invention provides a method comprising: at least one of providing or receiving a copy of a computer program that is encoded in a set of data signals, wherein the computer program enables a computer system to implement a method of managing messages, the method comprising: identifying an event related to a publisher; initiating a transaction for processing the event in response to the identifying; processing the event within the transaction, the processing including: providing data corresponding to the event for use by a set of subscribers to the event; and identifying data related to the set of subscribers to the event; and committing the transaction after the processing.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for managing messaging in which an event related to a publisher is identified. In response to the event, a transaction is initiated for processing the event, the event is processed within the transaction, and the transaction is committed after the event is processed. During processing, data corresponding to the event is provided for use by a set of subscribers to the event, and data related to the set of subscribers is identified. In an embodiment, a message broker in a publication and subscribe messaging environment implements the solution in order to be capable of providing the data related to the set of subscribers to the publisher. Use of the transaction ensures that the data related to the set of subscribers accurately represents the set of subscribers at the time that the data corresponding to the event was provided. As used herein, unless otherwise noted, the term "set" means one or more (i.e., at least one) and the phrase "any solution" means any now known or later developed solution.

Figure 1:
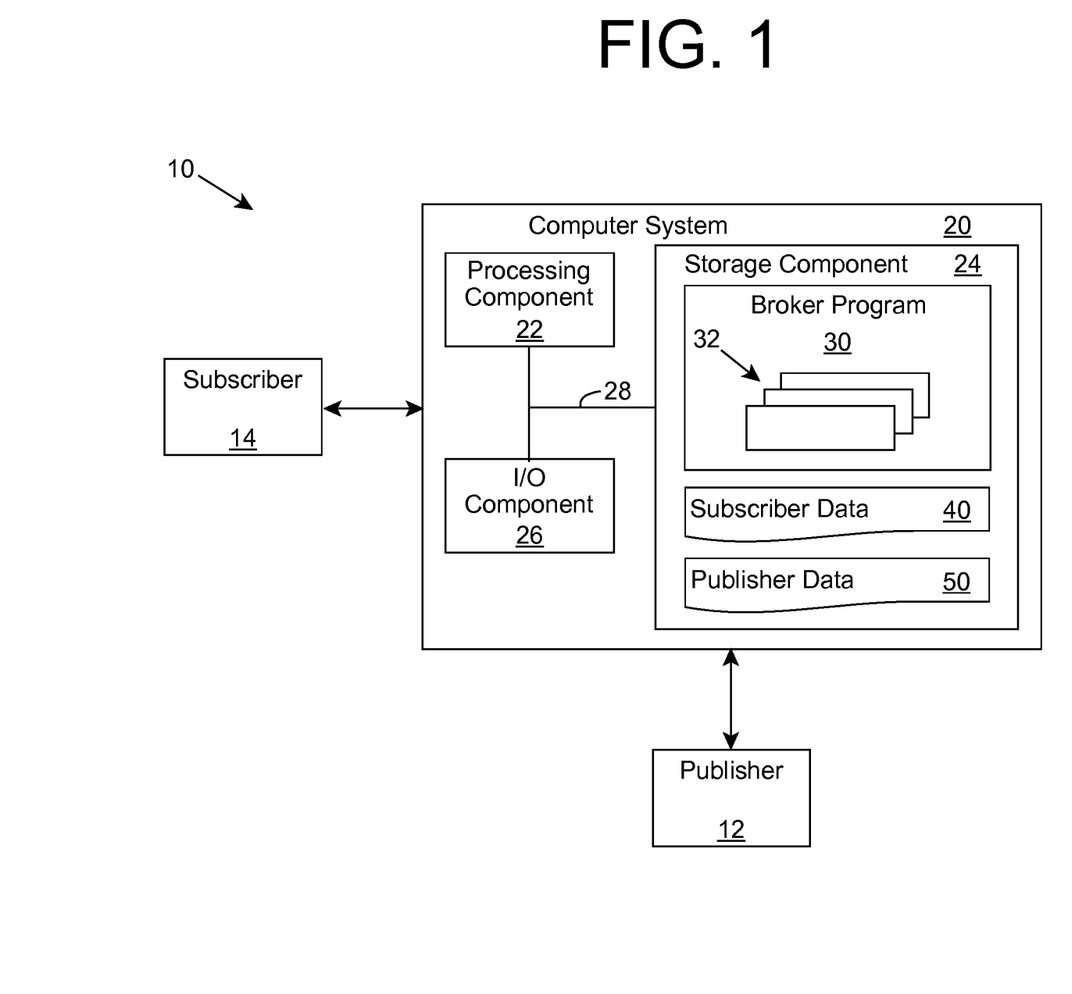
FIG. 1 shows an illustrative environment for processing events and corresponding messages according to an embodiment.

Turning to the drawings, FIG. 1 shows an illustrative environment 10 for processing events and corresponding messages according to an embodiment. To this extent, environment 10 includes a computer system 20 that can perform a process described herein in order to manage messaging between a publisher 12 and a subscriber 14. In particular, computer system 20 is shown including a broker program 30, which makes computer system 20 operable to manage messaging between publisher 12 and subscriber 14 by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as broker program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user (e.g., publisher 12 or subscriber 14) to interact with computer system 20 and/or one or more communications devices to enable a system user (e.g., publisher 12 or subscriber 14) to communicate with computer system 20 using any type of communications link. To this extent, broker program 30 can manage a set of interfaces (e.g., graphical user interface(s), application program interface, and/or the like) that enable human and/or system users to interact with broker program 30. While publisher 12 and subscriber 14 are shown as being implemented apart from computer system 20, it is understood that publisher 12 and/or subscriber 14 may be implemented within computer system 20 (e.g., as processes executing on computer system 20). Further, broker program 30 can manage (e.g., store, retrieve, create, manipulate, organize, present, etc.) the data, such as subscriber data 40, using any solution.

In any event, computer system 20 can comprise one or more general purpose computing articles of manufacture (e.g., computing devices) capable of executing program code, such as broker program 30, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, broker program 30 can be embodied as any combination of system software and/or application software.

Further, broker program 30 can be implemented using a set of modules 32. In this case, a module 32 can enable computer system 20 to perform a set of tasks used by broker program 30, and can be separately developed and/or implemented apart from other portions of broker program 30. As used herein, the term "component" means any configuration of hardware, with or without software, which implements the functionality described in conjunction therewith using any solution, while the term "module" means program code that enables a computer system 20 to implement the functionality described in conjunction therewith using any solution. When fixed in a storage component 24 of a computer system 20 that includes a processing component 22, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of broker program 30 fixed thereon (e.g., one or more modules 32). However, it is understood that computer system 20 and broker program 30 are only representative of various possible equivalent computer systems that may perform a process described herein. To this extent, in other embodiments, the functionality provided by computer system 20 and broker program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, broker program 30 enables computer system 20 to manage messaging between publisher 12 and subscriber 14. It is understood that while only a single publisher 12 and subscriber 14 are shown and discussed herein, computer system 20 can manage messaging between any number of publishers 12 and subscribers 14. Further, it is understood that publisher 12 and subscriber 14 are not mutually exclusive designations. To this extent, a publisher 12 may also be a subscriber 14 for events related to other publishers 12, and a subscriber 14 may also be a publisher 12. Regardless, computer system 20 manages subscriber data 40 for a set of subscribers 14 and publisher data 50 for a set of publishers 12 using any solution. Subscriber data 40 and publisher data 50 can include various details on each subscriber 14 and publisher 12, respectively, such as identification information (e.g., a unique identifier, an email address, a network address, etc.), attribute(s) of subscriber 14 or publisher 12 (e.g., system type, persistent or non-persistent, durable not durable, etc.), a status of subscriber 14 or publisher 12 (e.g., connected or not connected, etc.), communications information (e.g., address(es), maximum quality-of service, etc.), and/or the like.

Additionally, subscriber data 40 can include data on one or more events on which subscriber 14 desires information. In an embodiment, each subscriber 14 registers with computer system 20 and identifies the set of events using any solution. For example, an event can be identified according to various event attributes, such as a corresponding publisher 12 (e.g., all messages received from publisher 12), a type of publisher 12 (e.g., all messages received from printers), a type of event (e.g., particular type of message), and/or the like, as well as any combination of two or more event attributes. Further, the event attributes can include a corresponding notification timing solution to be used in providing message(s) to subscriber 14. Illustrative notification timing solutions can include notification upon receipt of a message from publisher 12, periodic notification of one or more messages received for a given time period (e.g., once for each day for which one or more messages were received), and/or the like.

Regardless, computer system 20 manages subscriber data 40 and publisher data 50 in order to provide the desired communications between publisher(s) 12 and subscriber(s) 14 in a publish and subscribe (pub/sub) messaging system. To this extent, computer system 20 is commonly referred to as a message broker. In addition to publishing messages received from publisher 12 to zero or more subscribers 14, computer system 20 can provide subscriber metadata for use by publisher 12. The subscriber metadata can comprise statistical information on the subscriber(s) 14, such as a total number of subscribers 14, a total number of subscribers 14 of a particular type (e.g., persistent or non-persistent), a total number of subscribers 14 of a particular status (e.g., connected or not connected), and/or the like. Further, the subscriber metadata can comprise information corresponding to the individual subscriber(s) 14. For example, the subscriber metadata can comprise identification information for, attribute information for, etc., each subscriber 14 that receives the publication.

Figure 2:
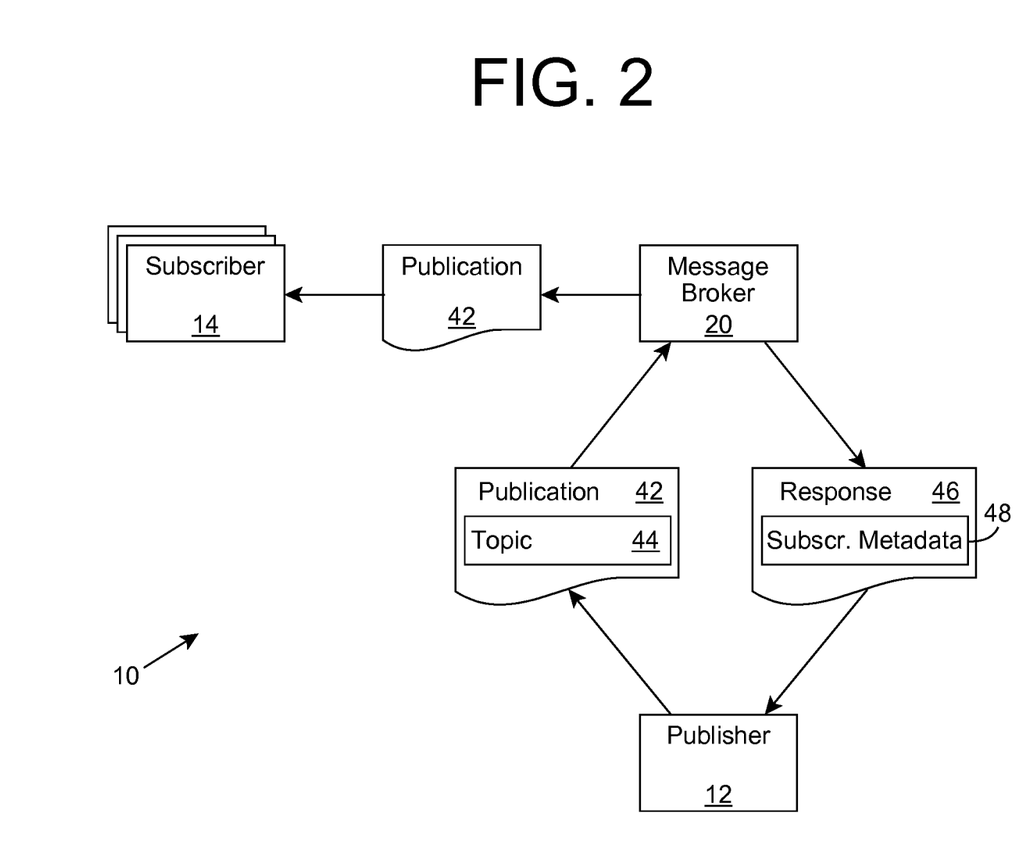
FIG. 2 shows an illustrative data flow diagram for the environment of FIG. 1 according to an embodiment of the invention.
Figure 3:
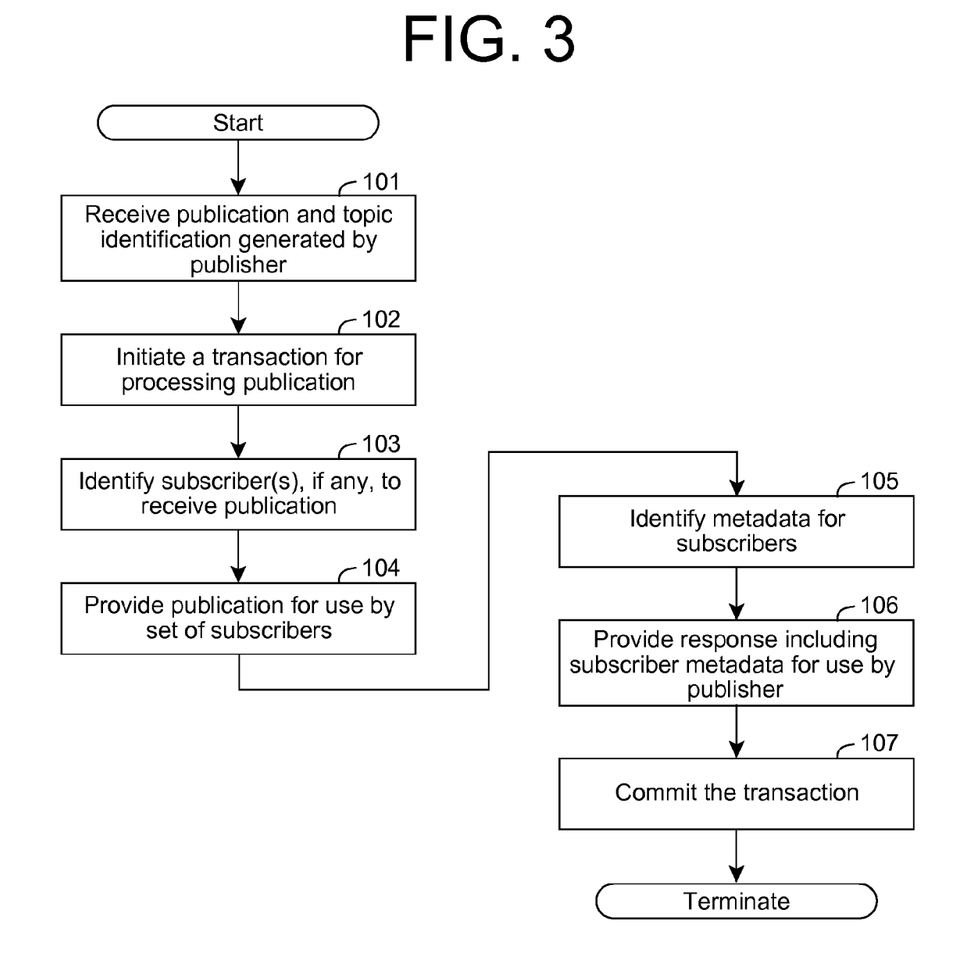
FIG. 3 shows an illustrative process flow diagram according to an embodiment.

FIG. 2 shows an illustrative data flow diagram for environment 10 according to an embodiment of the invention, and FIG. 3 shows an illustrative process flow diagram according to an embodiment. Illustrative aspects of an embodiment of the invention are further described with reference to FIGS. 2 and 3.

In process 101, message broker 20 receives a publication 42 from a publisher 12. In an embodiment, publication 42 can include a topic identification 44, which corresponds to a topic on which the publication 42 relates. In an embodiment, topic identification 44 includes an additional set of fields indicating that publisher 12 desires to receive subscriber metadata for the publication 42. For example, topic identification can include a set of fields indicating that publisher 12 desires any combination of various metadata on the subscribers 14. In an alternative embodiment, publisher 12 can provide the set of fields with a corresponding topic identification 44 to message broker 20 apart from a particular publication 42, which message broker 20 can store as publisher data 50 (FIG. 1). In this case, message broker 20 can look up the topic identification 44 included in publication 42 with publisher data 50 and to determine the subscriber metadata, if any, that publisher 12 desires for the publication 42.

Upon identifying an event related to publisher 12, message broker 20 can process the event. In an embodiment, receipt of publication 42 by message broker 20 is the event. Further, the event can comprise receipt of publication 42 for which publisher 12 desires subscriber metadata. Still further, the event can comprise expiration of a predetermined amount of time since message broker 20 has processed publication(s) 42 received from publisher 12. It is understood that numerous alternative event types could be utilized.

Regardless, in process 102, in response to identifying the event, message broker 20 initiates a transaction for processing the event (e.g., publication 42). As is known in the art, the transaction enables message broker 20 to ensure that either all or none of multiple actions required to be performed by message broker 20 in response to the event are actually performed. Further, the transaction can lock one or more data items that message broker 20 may read and/or modify during the event processing to ensure that no other process modifies the data item(s). For example, message broker 20 can lock subscriber data 40 (FIG. 1) to prevent it from being modified by another process (e.g., a subscriber registration process) executing in environment 10 using the transaction.

Subsequently, message broker 20 processes the event within the transaction. For example, in process 103, message broker 20 identifies zero or more subscribers 14 that are to receive the publication 42 using any solution. For example, message broker 20 can lookup subscriber(s) 14 using subscriber data 40 (FIG. 1) that have designated that they want to receive publications 42 having the topic identification 44, that are from publisher 12, and/or the like.

In process 104, message broker 20 provides publication 42 for use by a set of subscribers 14 using any solution. For example, message broker 20 can transmit publication 42 to each subscriber 14 using any type of asynchronous communications protocol (e.g., email, message queues, and/or the like).

In process 105, message broker 20 identifies the subscriber metadata for the set of subscribers 14, which publisher 12 has indicated is desired, using any solution. For example, message broker 20 can identify data relating to the set of subscribers 14 using subscriber data 40 (FIG. 1). As discussed herein, the data can comprise summary/statistical data for the set of subscribers 14 (e.g., how many subscribers 14 were sent publication 42) and/or data on each individual subscriber 14 (e.g., an identifier and/or one or more attributes of each subscriber 14). Message broker 20 can store the identified data using any solution, e.g., as publisher data 50 (FIG. 1) associated with publisher 12, data associated with topic 44, data associated with publication 42, data associated to an event related to publication 42, and/or the like.

In process 106, message broker 20 provides a response 46 to the publication 42 for use by publisher 12. Response 46 can indicate, for example, that message broker 20 has provided publication 42 for use by all subscribers 14. Additionally, response 46 can include some or all of the subscriber metadata 48 that publisher 12 indicated was desired and/or an indicator identifying how publisher 12 can obtain subscriber metadata 48. For example, response 46 can include an additional set of fields, each of which includes subscriber metadata 48 and/or an identification of how to obtain subscriber metadata 48 (e.g., where it is stored on message broker 20). To this extent, subscriber metadata 48 can include a field that includes a single value, such as a statistic for the set of subscribers 14, a group of fields, each of which includes data specific to each subscriber 14, and/or the like.

In process 107, message broker 20 commits the transaction. As shown in the illustrative process, message broker 20 identifies and provides the publication to all subscribers 14 and identifies data on the subscribers 14 in a transaction. Use of the transaction assures that the subscriber metadata 48 that is provided to publisher 12 accurately reflects the subscribers 14 that were sent the publication 42. It is understood that the process shown in FIG. 3 is only illustrative of numerous processes that can be implemented. To this extent, the order of one or more of the tasks can be changed, two or more tasks can be combined or performed in parallel, one or more tasks may not be required, and/or the like. For example, message broker 20 could perform process 106 after committing the transaction in an alternative embodiment.

In an illustrative application, message broker 20 may be publishing messages to subscribers 14 that comprise control servers or components in a distributed software system. In this case, each subscriber 14 can comprise a durable subscriber, which subscribes to relevant topics at message broker 20 the first time it is started, and reconnects to message broker 20 on subsequent restarts. Further, the number of subscribers 14 may change over time to meet capacity requirements for the system, and one or more subscribers 14 may become unavailable (e.g., intentionally or through a crash) at any time. The publisher 12 can comprise a control system that publishes messages to the subscribers 14 to check on their availability or control their configuration, and requests responses from each subscriber 14.

In order to know whether all subscribers 14 (e.g., servers) received and successfully processed the publication, the control system may desire to know how many subscribers 14 received the publication and/or their subscriber IDs. In this case, publisher 12 can inform message broker 20 that it desires to know the number of subscribers 14 to which the publication was provided and the corresponding subscriber ID of each subscriber 14. Additionally, publisher 12 may desire additional information, such as how many of the subscribers 14 are persistent (and/or non-persistent), how many of the persistent subscribers are currently connected (and/or currently not connected), and/or the like. Such information can enable publisher 12 to identify expectations about the timing in which subscribers 14 will receive the publication and when a corresponding response can be expected. In any event, message broker 20 can identify the desired information within a transaction while processing the publication.

While shown and described herein as a method and system for managing messaging between a publisher and subscriber(s), it is understood that aspects of the invention further provide various alternative embodiments. For example, in one embodiment, the invention provides a computer program fixed in at least one computer-readable medium, which when executed, enables a computer system to manage messaging between a publisher and subscriber(s). To this extent, the computer-readable medium includes program code, such as broker program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as broker program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing messaging between a publisher and subscriber(s). In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing messaging, the method comprising:
    identifying a topic for a periodic publication related to a publisher using a message broker;
    initiating a transaction on the message broker for processing the periodic publication in response to the identifying;
    processing the periodic publication within the transaction using the message broker, the processing including:
        identifying a set of subscribers to the periodic publication using the topic;
        providing data corresponding to the periodic publication for use by the set of subscribers to the periodic publication;
        locking an item of the data that the message broker is excluded from reading or modifying during the processing, wherein the locking prevents another process from modifying the item of the data;
        receiving subscriber metadata for the set of subscribers corresponding to a set of fields included with the topic, wherein the set of fields includes at least one field indicating that the subscriber metadata is requested by the publisher, wherein the subscriber metadata includes data related to the set of subscribers to the periodic publication representing the set of subscribers at the time that the data corresponding to the periodic publication was provided; and providing a response for use by the publisher, wherein the response includes the subscriber metadata for the set of subscribers corresponding to the set of fields included with the topic; and committing the transaction after the processing.

2. The method of claim 1, wherein the data related to the set of subscribers includes a number of subscribers.

3. The method of claim 1, wherein the data related to the set of subscribers includes an identifier for each subscriber in the set of subscribers.

4. The method of claim 1, wherein the periodic publication is generated by the publisher at the message broker.

5. The method of claim 1, wherein the processing further includes determining the data related to the set of subscribers to the periodic publication to be identified using the topic.

6. The method of claim 1, wherein the set of subscribers includes at least one durable subscriber.

7. The method of claim 1, wherein the data related to the set of subscribers includes a subscriber status.

8. The method of claim 1, wherein the response further indicates a subscriber metadata source.

9. The method of claim 1, wherein the publisher comprises a plurality of publishers.

10. The method of claim 1, wherein the periodic publication further comprises a notification timing solution, and the processing further comprises identifying the set of subscribers using the notification timing solution.

11. The method of claim 1, wherein the data related to the set of subscribers includes an attribute for each subscriber in the set of subscribers.

12. A computer system for managing messaging, the system comprising:
    a processor;
    a memory;
    a component configured to identify a topic for a periodic publication related to a publisher;
    a component configured to initiate a transaction for processing the periodic publication in response to the identifying;
    a component configured to process the periodic publication within the transaction, wherein the processing includes:
        identifying a set of subscribers to the periodic publication using the topic;
        providing data corresponding to the periodic publication for use by the set of subscribers to the periodic publication;
        locking an item of the data that is excluded from being read or modified during the processing, wherein the locking prevents another process from modifying the item of the data;
        receiving subscriber metadata for the set of subscribers corresponding to a set of fields included with the topic, wherein the set of fields includes at least one field indicating that the subscriber metadata is requested by the publisher, wherein the subscriber metadata includes data related to the set of subscribers to the periodic publication representing the set of subscribers at the time that the data corresponding to the periodic publication was provided; and providing a response for use by the publisher, wherein the response includes the subscriber metadata for the set of subscribers corresponding to the set of fields included with the topic; and
    a component configured to commit the transaction after the processing.

13. The system of claim 12, wherein the data related to the set of subscribers includes at least one of: a number of subscribers or an identifier for each subscriber in the set of subscribers.

14. The system of claim 12, wherein the periodic publication is generated by the publisher.

15. The system of claim 12, wherein the processing further includes determining the data related to the set of subscribers to the periodic publication to be identified using the topic.

16. A computer program comprising program code embodied in at least one computer-readable memory, which when executed, enables a computer system to implement a method of managing messaging, the method comprising:
    identifying a topic for a periodic publication related to a publisher;
    initiating a transaction for processing the periodic publication in response to the identifying;
    processing the periodic publication within the transaction, the processing including:
        identifying a set of subscribers to the periodic publication using the topic;
        providing data corresponding to the periodic publication for use by the set of subscribers to the periodic publication;
        locking an item of the data that is excluded from being read or modified during the processing, wherein the locking prevents another process from modifying the item of the data;
        receiving subscriber metadata for the set of subscribers corresponding to a set of fields included with the topic, wherein the set of fields includes at least one field indicating that the subscriber metadata is requested by the publisher, wherein the subscriber metadata includes data related to the set of subscribers to the periodic publication representing the set of subscribers at the time that the data corresponding to the periodic publication was provided; and
        providing a response for use by the publisher, wherein the response includes the subscriber metadata for the set of subscribers corresponding to the set of fields included with the topic; and
    committing the transaction after the processing.

17. The computer program of claim 16, wherein the data related to the set of subscribers includes at least one of: a number of subscribers or an identifier for each subscriber in the set of subscribers.

18. The computer program of claim 16, wherein the periodic publication is generated by the publisher.

19. The computer program of claim 16, wherein the processing further includes determining the data related to the set of subscribers to the periodic publication to be identified using the topic.

20. A method of generating a system for managing messaging, the method comprising:
    providing a computer system operable to:
        identify a topic for a periodic publication related to a publisher, the processing further including identifying a set of subscribers to the periodic publication using the topic;
        initiate a transaction for processing the periodic publication in response to the identifying;
        process the periodic publication within the transaction, the processing including:
            providing data corresponding to the publication for use by the set of subscribers to the publication;

locking an item of the data that is excluded from being read or modified during the processing, wherein the locking prevents another process from modifying the item of the data;

receiving subscriber metadata for the set of subscribers corresponding to a set of fields included with the topic, wherein the set of fields includes at least one field indicating that the subscriber metadata is requested by the publisher, wherein the subscriber metadata includes data related to the set of subscribers to the publication representing the set of subscribers at the time that the data corresponding to the publication was provided; and providing a response for use by the publisher, wherein the response includes the subscriber metadata for the set of subscribers corresponding to the set of fields included with the topic; and commit the transaction after the processing.

* * * * *